United States Patent [19]

Girndt

[11] Patent Number: 5,175,964
[45] Date of Patent: Jan. 5, 1993

[54] METHOD AND APPARATUS FOR REMOVING FLAWS FROM INTERNAL PIPE WALLS

[76] Inventor: Richard J. Girndt, P.O. Box 9643, Houston, Tex. 77213

[21] Appl. No.: 736,101

[22] Filed: Jul. 26, 1991

[51] Int. Cl.⁵ .......................... B24B 1/00; B24B 7/00
[52] U.S. Cl. .............................. 51/281 P; 51/72 R; 51/165.74; 51/354
[58] Field of Search ............. 51/72 R, 165.74, 165.71, 51/75 R, 47, 99, 34 C, 411, 281 P, 290, 323, 34 K, 33 R, 354, 126

[56] References Cited

U.S. PATENT DOCUMENTS

| | | | |
|---|---|---|---|
| 2,612,008 | 9/1952 | Kuniholm et al. | 51/290 |
| 2,671,297 | 3/1954 | Arms | 51/290 |
| 2,922,257 | 1/1960 | Else | 51/34 C |
| 3,146,551 | 9/1964 | Carlsen et al. | 51/34 C |
| 3,824,738 | 7/1974 | Hall et al. | 51/290 |
| 3,835,587 | 9/1974 | Hall, Jr. | 51/281 P |
| 3,852,917 | 12/1974 | McKown | 51/99 |
| 4,606,150 | 8/1986 | Grimm | 51/34 C |
| 4,934,109 | 6/1990 | Allred | 51/290 |
| 5,067,085 | 11/1991 | Wenzel et al. | 51/165.71 |

Primary Examiner—Frank T. Yost
Assistant Examiner—Hwei-Siu Payer
Attorney, Agent, or Firm—Browning, Bushman, Anderson & Brookhart

[57] ABSTRACT

An improved technique is provided for removing flaws from internal pipe walls, and particularly the internal walls of tubes used in petroleum drilling and recovering operations. An ultrasonic detection unit positioned exterior of the oilfield tube is used to detect the defect. A powered grinding wheel is positioned on a support which may be axially moved to a desired location within the tubular passageway. A powered reciprocation unit including a crank arm and a connecting rod extending from the crank arm is used to reciprocate the grinding wheel with respect to the tubular member. The apparatus is provided with a base and a plurality of rollers for supporting and controlling the tubular member. A camera and a spray unit may be provided adjacent the grinding wheel. According to the method of the present invention, the grinding unit and the reciprocation unit are simultaneously activated to remove material adjacent the detected defect, thereby providing a highly reliable repair technique which minimizes operator fatigue.

20 Claims, 3 Drawing Sheets

METHOD AND APPARATUS FOR REMOVING FLAWS FROM INTERNAL PIPE WALLS

FIELD OF THE INVENTION

The present invention relates to improved techniques for detecting and removing flaws from the interior surface of an elongate, hollow metal goods, such as tubes commonly used in petroleum drilling and recovery operations. More particularly, the present invention relates to semi-portable methods and apparatus for inexpensively and reliably removing cracks and similar defects from the interior walls of oilfield tubes while monitoring material removal.

BACKGROUND OF THE INVENTION

Those familiar with structural metal goods have long recognized that cracks, pits, seams, and other defects along the surface of such goods can propagate and result in catastrophic failure. The likelihood of defect propagation is increased if the goods are repeatedly subject to high fluid pressures and/or corrosive fluids. Those familiar with oilfield tubes, such as drill pipe and casing used in hydrocarbon recovery operations, have recognized the importance of detecting such defects. Standards such as those set by the American Petroleum Institute are accordingly used to regulate the use of oilfield tubes with surface defects. Typical API standards dictate, for example, that a tubular cannot be used in a wellbore if it contains a defect which penetrates more than $12\frac{1}{2}\%$ of the nominal wall thickness, and that a surface defect does not warrant rejecting the tube if it penetrates less than 5% of the tubular nominal wall thickness. As may be expected, many surface defects fall within the 5% to $12\frac{1}{2}\%$ range, and regulations expectedly require that, if a tube with such a defect is to be used, the defect must be effectively removed to prevent propagation and thus risk failure of the tubular string in the well bore. An entire industry has thus developed to check oilfield tubes for defects.

Various techniques have been developed to detect the presence and size of defects in tubes. Although different companies tout the alleged advantages of the different techniques, the ultrasonic detection technique is widely recognized as a preferred defect detection technique due to its speed, reliability, and relatively low cost. Ultrasonic detection equipment thus may be transported to a pipe yard or similar temporary storage area where new tubulars may be inspected prior to use or reuse. If a defect which is less than the amount which mandates rejection of the tube yet greater than the allowable limit for immediate use is detected in the outer wall of the tube, the tubular may be marked and set aside. Portable grinding equipment may then be used by trained operators to grind the outer tubular surface in the vicinity of the defect, thereby effectively removing the defect and allowing the tube to be rechecked and, if found satisfactory, used in oilfield operations.

Much of the attractiveness of this tube repair procedure is lost, however, if the defect detection equipment locates a defect in the inner wall of the tube. The difficulty involved with reliably repairing such defects has caused many drilling operators to forgo repair operations, and thus hundreds of thousands of dollars are spent purchasing new tubes rather than repairing tubes with interior wall defects. While methods and equipment have been used to repair such interior rube defects, these operations to date are time-consuming and have been considered unreliable. Thus the vast majority of work performed in the tubular detection and removal industry is involved only in exterior defects.

One technique for repairing internal surface tue defects essentially involves securing a power grinder at the end of a long stick. Tubes are typically checked with detection equipment located on top of the tubes and, when an interior surface defect is located, the pipe is marked and thereafter rotated so that the defect is on the bottom of the tube. The drill motor is then inserted into the tube using the stick. Gravity bends the stick so that the motor and grinding unit rest on the bottom of the tue, and the operator activates the motor then moves the motor axially with respect to the tube by pushing and pulling the stick further in and out of the pipe in an attempt to grind off the defect. This procedure and variations of this procedure, while crude, time-consuming, and understandably not highly reliable, nevertheless is sometimes used to remove interior defects in oilfield tubes.

Another system for removing interior tube defects utilizes a special mandrel adjacent one end of this equipment for each diameter tube to be repaired. An air driven grinding wheel is pivotably mounted to the mandrel, and a control cable extends from the mandrel to a manual pressure control mechanism. An elongate rod is structurally connected at one end to the mandrel, and during use of the equipment extends from the tubular with the control cable. The operator manually reciprocates the rod and thus the mandrel and grinding motor with respect to the tube, during which time radial grinding pressure on the pivotable motor is regulated with the cable. This procedure, while somewhat more sophisticated than the earlier described technique, is still manually controlled. While the defect repair may be monitored during the grinding operation utilizing portable defect detection equipment, it is difficult for the operator to keep the grinding wheel properly on or about the defect, and this technique is physically taxing on the operator. The disadvantages of the prior art overcome by the present invention, and improved methods and apparatus are hereinafter disclosed for inexpensively and reliably moving defects from the interior wall of an elongate metal good, such as an oilfield tube. The equipment of the present invention is reliable, relatively inexpensive, not labor intensive, and may be reliably practiced at pipe inspection yards to repair oilfield tubes with interior wall defects.

SUMMARY OF THE INVENTION

The present invention may be reliably utilized to repair defects on the interior surface of metal goods, and is particularly well suited for and is discussed in detail below for repairing oilfield tubes ranging from a nominal diameter of about $2\frac{7}{8}''$ to about $13\frac{3}{8}''$. As explained subsequently, the same equipment may be used with different diameter tubes, so that a large inventory of special tools need not be maintained, and little or no downtime is required before repairing different sizes tubes.

The technique of the present invention preferably utilizes ultrasonic detection equipment to monitor the repair operation. While other defect detection systems may be used, the ultrasonic technique is preferred due to its low cost, high speed, and high reliability. As previously noted, the repair equipment of the present invention is relatively semi-portable, and typically would be in the range of from about 800 pounds to about 1,800 pounds, which is much greater than the lightweight portable equipment of the prior art. The repair technique of the present invention does not require a great deal of operator time, and is neither physically nor mentally taxing on the operator.

Rollers mounted on posts affixed to a base allow the tube to be properly positioned with respect to the repair equipment. An air motor and grinding wheel is pivotably mounted on a motor support, which slides within the flow path of the tube. An air powered drive motor and crank reciprocate an elongate strap or rod which is connected to the grinding wheel motor for reciprocating the grinding wheel motor with respect to the support. A spring acting on the grinding motor biases the grinding wheel radially away from the pipe, while a cable with an adjustable weight located outside the pipe counteracts the spring to bring the grinding wheel into engagement with the internal wall of the pipe. A camera located adjacent the grinding wheel allows the material removal operation to be visually viewed in conjunction with the output from the detection equipment, and an adjacent spray gun enables the ground surface to be covered with a suitable protective coating.

It is an object of the present invention to provide improved methods and apparatus for removing defects from the interior surface of an elongate metal goods, such as oilfield tubular goods.

It is another object of this invention to provide a technique for repairing defects on the interior wall of oilfield tubulars which minimizes the physical and mental strain on an operator compared to prior art defect removal techniques.

It is a further object of the present invention to provide an apparatus for removing interior surface defects on oilfield tubes by a grinding operation, wherein the grinding wheel is axially reciprocated with respect to the tube by a power drive mechanism.

It is a feature of the present invention to provide improved defect removal equipment which may be permanently installed in a plant and provided with a machine base, thereby enabling the equipment to be reliably utilized and minimizing operator effort.

It is another feature of the present invention to provide a defect removal procedure which allows the removal operation to be monitored in real time with defect detection equipment, and preferably with ultrasonic defect detection equipment.

It is a further feature of the present invention to provide a technique for removing defects from the interior surface of oilfield tubes wherein the radial force of the grinding wheel on the interior surface of the pipe may be selected and maintained at the selected value.

Still another feature of this invention is to provide improved techniques for visually monitoring the removal of material adjacent a defect on an interior surface of an oilfield tube, and for easily and reliably treating the area where the defect has been removed.

A significant advantage of the present invention is that defective goods, such as oilfield tubes, may be reliably repaired according to the techniques of the present invention which would otherwise have been considered to have a nominal or salvage value.

It is a further advantage of the present advantage of the present invention that the reliability and speed of removing defects from the interior surface of a tube is increased, thereby increasing the safety of oilfield operations utilizing new and used tubulars while minimizing tube repair costs.

These and further objections, features, and advantages of the present invention will become apparent from the following detailed description, wherein reference is made to the figures in the accompanying drawings.

DETAILED DESCRIPTION OF PREFERRED EMBODIMENTS

Figure 1:
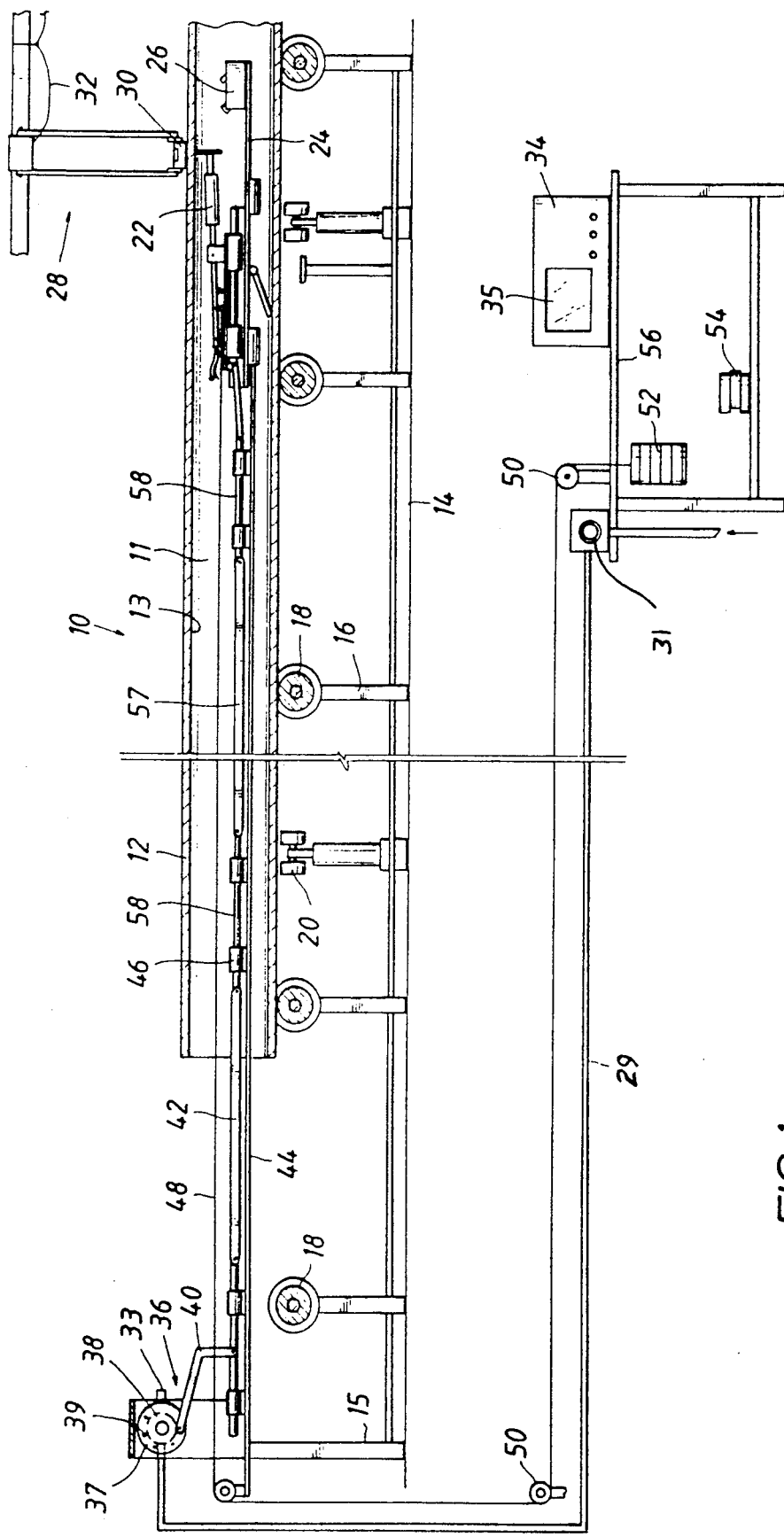
FIG. 1 is a combined pictorial and schematic view, partially in cross-section, of suitable equipment according to the present invention for repairing defects on the interior surface of an oilfield tube.

FIG. 1 depicts a suitable assembly 10 for repairing an oilfield tubular 12 or similar elongate metal member having an axially extending cylindrical passageway 11 therein defined at least in part by an interior surface 13. For purposes of the following description, it may be presumed that the tubular member 12 has been checked with a defect detection unit and requires repair. The techniques of the present invention may, however, be used in conjunction with the defect detection operation. This results in tubes formerly being designated as "rejected" to come out of the detection process as "accepted" or "prime" instead of being designated for repair at a later date.

Figure 3:
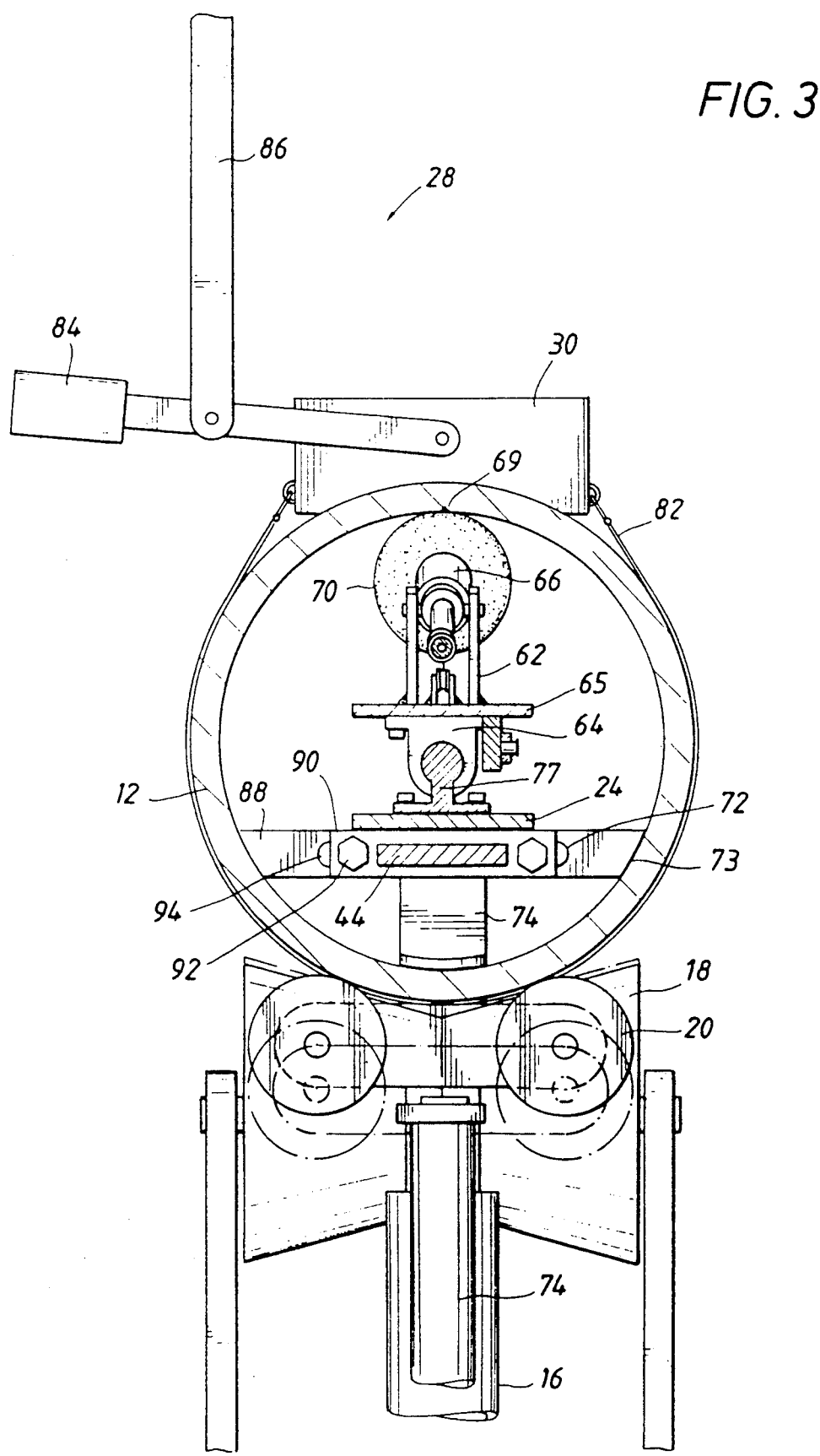
FIG. 3 is a cross-sectional view along liens 3—3 in FIG. 2.

It is a feature of the present invention that apparatus 10 is permanently installed, rather than being portable. It is envisioned that the apparatus depicted in FIG. 1 will be in the range of from about 2,000 pounds to about 5,000 pounds. The apparatus 10 is thus provided with a base 14, which may comprise sections which are bolted together in a standard manner. A plurality of upright support 16 may be bolted, welded, or otherwise fixed to the base. Rollers 18 each positioned on top a respective support are provided for supporting and axially moving the tubular member 12 with respect to the base. Each of the rollers may have a tapered supporting surface, as shown in FIG. 3. Additional side rollers 20 may also be provided to raise up after the pipe is in place to center a defect circumferentially over the grinding wheel or test equipment discussed subsequently.

Apparatus 10 includes a material removal unit 22 as generally shown in FIG. 1 for removing material adjacent the detected defect and thus allowing the tubular to be reliably used in oilfield operations. Removal unit 22 will be discussed in detail below, although it should be understood that the unit 22 is supported on and axially movable with respect to removal unit base or support 24, which in turn slideably engages the interior surface of the tubular member 12. An accessory package 26 also discussed subsequently may be provided at an end of support 24 and thus adjacent the material removal unit 22. A defect detection unit 28, which is preferably an ultrasonic detection unit, is provided with a detection head 30 positioned exterior of the tubular member 12. Conventional wiring 32 extends from the detection head 30 to control and display unit 34, which allows an operator to adjust the sensitivity of the ultrasonic detection unit and monitor the thickness of the tubular member on display screen 35 in order to visually monitor the removal of a defect in the tube in real time, i.e., as grinding is being performed.

Apparatus 10 also includes a powered reciprocation unit 36 secured in a conventional manner to the base 14 for reciprocating the material removal unit 22 with respect to the support 24. Reciprocation unit 36 comprises a drive motor 38, a crank arm 40 rotatably driven by the drive motor, and a connecting rod 42 extending from the crank arm 40 to the material removal unit. Motor 38 may be powered by any suitable source, but preferably is powered by electricity. Motor speed may be controlled by a suitable rheostat 33. Preferably this motor speed control is located adjacent table 56, and accordingly speed controller 31 is shown in FIG. 1 at the operator station, and electrical line 29 extends from the controller 31 to motor 38. Plate 44 may be slidably mounted at one end to a suitable vertical support 15 for the motor 38, and at its opposing end is secured to material removal unit support 24. A connecting rod 42 may be formed from a relatively thin, strap-like material, or alternatively may be formed from a cylindrical rod. In one embodiment, the connecting rod 42 comprises a plurality of thin strap sections 57 spaced between corresponding rod-like sections 58. A plurality of guides 46 may be mounted to the plate 44 and assist in guiding the elongate connecting rod 42 as it is reciprocated by the motor 38. It should be understood, however, that guides 46 will not be required in all cases, and in another embodiment of the invention the machine 10 utilizes only an elongate strap-like material between the crank 40 and the material removal nit 22, with the elongate strap flexing into engagement with the bottom interior surface of the tubular member 12 to reciprocate unit 22 with respect to the tube.

A cable 48 extends from removal unit 22 outward from the tubular member 12, and is guided by a plurality of sheaves 50 to accommodate adjustable weight mechanism 52 exterior of the tubular member and adapted for selectively adjusting the tension in the cable 48. Additional weights 54 of a selected amount are available for adding to or detracting a pre-selected amount of weight from mechanism 52 and thereby easily altering and fixing the tension in the cable 48. As shown in FIG. 1, adjustable weight mechanism 52 and the ultrasonic detection unit control panel 34 may be provided on a suitable table 56 which is structurally independent from the base 14, but preferably is provided at a convenient location between the motor 38 and the detection unit 28.

It is a feature of the present invention that the reciprocation 36 includes an adjustment member for adjusting the stroke of the reciprocating connecting rod 42. Although various mechanisms may be used for achieving this objection, one such mechanism includes providing a plurality of apertures 39 in disk 37 which is rotated by the motor 38 and which structurally connects the output of the motor to the crank arm 40. The end of the crank arm 40 may thus be secured to the disk 37 by selecting one of the apertures 39, with each of the apertures 39 located on the disk 37 a different selected distance from the axis of the rotating disk. Accordingly, bu securing the crank arm 40 in one of the inward apertures 39, the stroke of the connecting rod 42 will be minimized. The desired stroke may be increased by changing the interconnection of the crank arm 40 to one of the axially outward apertures in the disk 37.

Figure 2:
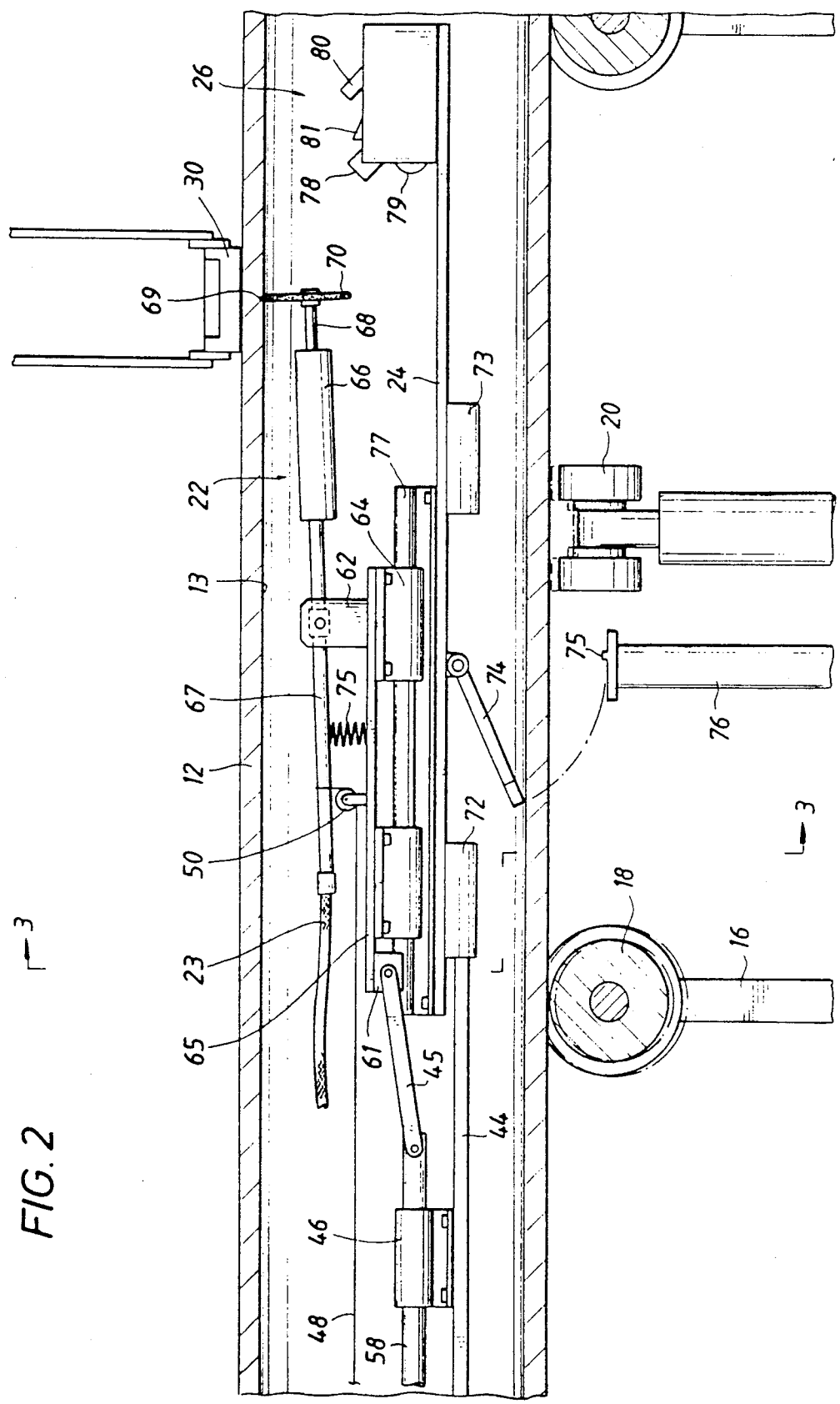
FIG. 2 is a more detailed pictorial view of a portion of the equipment shown in FIG. 1.

FIG. 2 depicts in greater detail the material removal unit 22 and the support 24 generally shown in FIG. 1.

As previously noted, elongate plate 44 may be provided, and is fixed at one end to cross plate 72, which in turn is fixed to support plate 24. One or more additional cross plates 73 each also affixed to support plate 24 may be provided to position the support plate 24 within the passageway of the tubular, with each cross plate 72, 73 engaging the side walls of the tubular member as shown in FIG. 3. A temporary support member 74 may be pivotably connected to plate 24 as shown, and may engage a vertical support 76 affixed to the base 14. Support 76 includes a stop 75 for engaging temporary member 74, and thus supports the material removal unit 22 and the support 24 on the post 76 before the tubular member 12 is slid over the material removal unit 22.

Material removal unit 22 comprises a powered motor 66, which preferably may be power driven and is thus connected through pneumatic line 23 to a suitable source. Motor 66 includes an output shaft 68, and a grinding wheel 70 is provided at the end of shaft 68 for grinding material on the inner surface 13 of the tubular member 12 adjacent the detected defect 69. The motor 66 may be mounted on conduit 567, which in turn is pivotably connected to vertical support 62, so that pivotable movement of conduit 67 with respect to support 62 causes the grinding wheel 70 to engage or disengage the inner surface 13 of the tubular member 12. Carrier plate 62 is fixed to vertical support 62, and a plurality of guide members 64 extend downwardly therefrom for sliding engagement with vertical member 77 extending upward from the support plate 24. A spring 75 acts between plate 65 and conduit 67, and biases the conduit radially toward the interior surface 13 of the conduit 12, and thus biases the grinding wheel 70 away from engagement with the interior surface 13. Cable 48 discussed previously is guided past sheave 50, and is connected at is extreme end to the conduit 67 for controlling the radial position of the grinding wheel. A link member 45 is pivotably connected at one end to rod 58, and at its other end to block 61, which in turn is fixed to the plate 65. The accessory package 26 provided at the end of plate 24 may include a camera 78 and a surface treatment unit 80, with the latter member comprising a spray nozzle for spraying a treatment material, such as a protective coating, on the interior surface after it is ground by grinding wheel 70. Also, an air nozzle 81 may be provided as part of the unit 26 for blowing dust away from the camera lens, and light 79 may be provided for illuminating the surface to be viewed by the camera 78.

FIG. 3 is a cross-sectional view along 3—3 in FIG. 2, and depicts tubular member 12 supported on rollers 20. The head 30 of the ultrasonic test unit 28 is held in engagement with the outer surface of the tubular member 12 by an elastic strap 82 secured at each end to the head 30. Bracket 86 extends downward from the frame of the ultrasonic test unit, and a counterweight 84 is provided for ensuring that a nominal weight force is applied by the head 30 to the tubular member 12. FIG. 3 depicts the grinding wheel 70 at the end of the motor 66, which in turn is supported by support 62 fixed on the plate 65. The upwardly projecting rail 77 is secured to cross plate 24, and accordingly members 64 slide along the rail of 77 to allow the removal unit 22 to reciprocate with respect to the cross plates 72. Pads 73 of the ends of the cross plates are provided for sliding engagement with the interior surface of the tubular member. It is a feature of the invention that each of the cross plates 72 may be adapted for engaging various size tubes. Without changing the distance between the pads 73 at the ends of the plates 72, a plate may optionally be used with different sized tubes since the interior diameter of the tue may only slightly raise or slightly lower the position of the material removal unit 22 with respect to the axis of the tube. Alternatively, and preferably, however, an end member 88 provided at each end of a cross member 72 may be adjusted inwardly or outwardly with respect to central member 90, with the selected position of each adjustable member 88 being locked in place by a conventional bolt 92. Accordingly, an elongate slot 94 may be provided in each of the end members 88, and each member 88 is positioned so that the spacing between pads 73 are at a selected distance, thereby resulting in the desired position of the removal unit 22 with respect to the axis of the tubular member 12. As a further alterative, the entirely of the cross members 72, 73 may be changed out prior to the repair unit 10 operating on a different sized tube.

The operation of the device may now be understood from the figures discussed herein. With the unit 22 supported by the temporary member 74 resting on vertical support 76, the tubular 12 may be slid to its desired position on rollers 18 so that the test head 30 is positioned axially in line with a defect. As the tubular is slid to its selected position as shown in FIG. 1, member 74 pivots upwardly as the tubular slides over the removal unit 22, with the cross plates 72, 73 thereafter supporting the removal unit within the tubular. Once axially positioned, the rollers 20 may be raised by activating suitable hydraulic cylinders, thereby allowing the pipe to be easily rotated for proper circumferential orientation of the defect relative to the grinding wheel and the testing unit, e.g., so that the interior defect is on the top side of the pipe. Proper circumferential orientation may be verified by the operator observing the defect on screen 35. Once the removal unit is positioned at approximately its desired position in the tubular member, the ultrasonic test unit may be activated so that head 30 locates the defect. During removal of material from the inner surface of the tubular 12, the ultrasonic test unit may remain activated, and accordingly the actual removal of material may be viewed on the screen 35 by the operator. When the unit 22 is at its desired position, a selected weight may be added to mechanism 52 to overcome the force of the spring and bring the grinding wheel into engagement with the inner surface of the tubular. Depending on the depth of the tubular, the hardness of the tubular, and other considerations, the selected radial force on the inner surface of the tubular may be easily altered by adding or removing additional weights 54. With the grinding wheel motor 66 activated, the reciprocating motor 38 may also be activated, thereby automatically reciprocating the connecting rod 42 and removing the removal unit 22 and thus he grinding wheel with respect to the base 24. The operator thus observes the operation on the screen 35, but need not continually exert a desired force or actuate a control to keep the grinding wheel in engagement with the surface of the tubular, and also need not reciprocate the grinding wheel with respect to the tubular. Once the desired material has been removed and the defect is no longer visible on the screen, the operator may deactivate the motors 38 and 22 and verify both that the ground surface of the tubular has eliminated the defect, and that the tubular member has maintained its necessary wall thickness to satisfy API regulations. If desired, the grinding operation may also be visually seen on a suitable screen with the use of lighting 79 and camera 78 positioned on accessory device 26. Blower 81 may be activated to blow dust and debris off the camera lens, and spray gun 80 activated to spray a suitable rust inhibitor or protective coating on the ground surface of the tubular member. When the tubular member has been so repaired, the tubular member may be pulled out to expose the material removal unit, and a new tubular member positioned for repair.

Although a powered grinding wheel is a preferred form of material removal unit according to the present invention, it should be understood that other devices for removing material on the inner surface of a tubular may be used instead of a grinding wheel. High pressure sandblasting techniques have been used to both clean and remove material adjacent an interior defect in a tube. Honing tools could also been employed, which may either remove material only in the area adjacent the defect, or may remove material along an entire 360° path of the inner surface of the tube in the area of the tube. The grinding wheel disclosed herein is preferred, however, due to its simplicity and speed of operation. It should also be understood that the ultrasonic defect detection technique is preferably employed to both monitor the removal of material adjacent the defect, and to check the tube to ensure that the defect is removed and that a sufficient wall thickness of tube remains in the area of the repair. Other defect detection methods and other techniques may be employed, however, to verify that the defect is removed. The ultrasonic technique is preferred due to its speed and reliability, and because it is ideally suited both to detect the removal of the defect and to verify the remaining wall thickness, without utilizing materials or techniques which may adversely effect the use of the oilfield tube. It should also be understood that it is preferable that the defect detection head be positioned on top of the pipe, and accordingly that the material removal unit be moved radially upward to engage the defect on the inner surface of the pipe adjacent the detection head. Alternatively, however, it is possible to utilize the concepts of the present invention with the defect detection equipment being located at a position other than the top of the pipe, in which case the material removal equipment would then move radially for engaging the defect area located adjacent the detection head.

As a further modification of the present invention, those skilled in the art will understand that the conventional cam drive mechanism may be employed between the reciprocating drive motor and the connecting arm, and that this cam drive mechanism may cause the grinding wheel to remain for a relatively long period of time in the area adjacent the defect, and that grinding wheel will then be positioned for a relatively shorter period of time at an area further removed from the defect. Although the grinding wheel would still reciprocate back and forth by the powered dive mechanism, a plot of grinding wheel position versus lapsed time in any incremental position may thus have a sinusoidal configuration, with the peak of the sinusoidal curve preferably being positioned in the area of the defect, and each of the ends of the curve at a position, for example, axially spaced $2\frac{1}{2}''$ from the defect. The use of such a camming mechanism will thus reduce the likelihood of sharp edges on the interior surface of the ground tubular as a result of the repair operation. Those skilled in the art will also understand that, while the present invention is particularly well adapted for repaired oilfield tubulars, the technique may be used to repair other metal goods, such as gas flow liens or other tubulars which must reliably transmit materials.

Various other modifications may be made to the apparatus and techniques discussed herein without departing from the spirit and scope of the invention. Accordingly, it should be understood that the foregoing description and the drawings provided herein are exemplary of the invention, and that this disclosure should not be understood as limiting the scope of the invention, which is defined by the following claims.

What is claimed is:

1. Apparatus for removing a detected defect from an interior surface of an elongate metal member having an axial passageway therein defined at least in part by the interior surface, the apparatus comprising:
   a powered material removal unit for positioning within the passageway to remove material adjacent the detected defect;
   a removal unit support axially movable within the passageway for engagement with the metal member to support the removal unit at a desired axial location within the passageway;
   a powered reciprocation unit for axially reciprocating the removal unit with respect to the support and the metal member; and
   a biasing mechanism for biasing the removal unit radially outward with respect to the metal member to remove material adjacent the detected defect.

2. The apparatus as defined in claim 1, further comprising:
   an ultrasonic detection unit for monitoring material removal in the area adjacent the detected defect.

3. The apparatus as defined in claim 1, further comprising:
   the material removal unit being pivotably mounted to the unit support; and
   the biasing mechanism includes a cable extending from the removal unit outward of the passageway, and an adjustable weight mechanism exterior of the metal member for selectively adjusting the tension in the cable and thus the radially outward pressure of the removal unit in the interior surface of the member.

4. The apparatus as defined in claim 1, further comprising:
   an apparatus base;
   a plurality of supports each affixed to the base; and
   a plurality of rollers each associated with a respective support for supporting and controllably positioning the metal member with respect to the base.

5. The apparatus of claim 1, wherein the material removal unit comprises:
   a powered motor; and
   a grinding wheel rotatably driven by the powered motor.

6. The apparatus as defined in claim 1, wherein the reciprocation unit comprises:
   a drive motor;
   a crank arm rotatably driven by the drive motor; and
   a connecting rod extending between the crank arm and the material removal unit and at least partially positioned within the passageway for reciprocating the material removal unit.

7. The apparatus as defined in claim 1, further comprising:
   a spring for biasing the material removal unit radially away from the interior surface of the metal member.

8. The apparatus as defined in claim 6, wherein the reciprocation unit further comprises:
   a reciprocating adjustment member for adjusting the stroke of the reciprocating connecting rod and thus the stroke of the material removal unit with respect to the metal member; and
   the reciprocation unit drive motor is exterior of the metal member.

9. The apparatus as defined in claim 1, further comprising:
   a camera adjacent the material removal unit for visually outputting an image of the area adjacent the detected defect; and
   a display monitor for receiving the image from the camera and outputting a display of the outputted image.

10. The apparatus as defined in claim 1, further comprising:
    a surface treatment unit adjacent the material removal unit for treating the surface adjacent the detected defect subsequent to the removal of the defect.

11. Apparatus for detecting and removing a defect from an interior surface of a metal tubular member having an axial passageway therein defined at least in part by the interior surface, the apparatus comprising:
    an ultrasonic detection unit for positioning exterior of the tubular member to detect the defect and to monitor material removal in the area adjacent the detected defect;
    a powered material removal unit for positioning within the passageway to removal material adjacent the detected defect;
    a removal unit support axially movable within the passageway for engagement with the tubular member to pivotably support the material removal unit at a desired axial location within the passageway;
    a powered reciprocation unit for axially reciprocating the material removal unit with respect to the support and the tubular member; and
    a biasing mechanism for biasing the material removal unit radially outward with respect to the tubular member to removal material adjacent the detected defect.

12. The apparatus as defined in claim 11, further comprising:
    a base;
    a plurality of supports each affixed to the base; and
    a plurality of rollers each associated with a respective support for supporting and controllably positioning the tubular member with respect to the base.

13. The apparatus as defined in claim 11, wherein the reciprocation unit comprises:
    a drive motor;
    a crank arm rotatably driven by the drive motor; and
    a connecting rod extending between the crank arm and the material removal unit and at least partially positioned within the passageway for reciprocating the material removal unit.

14. The apparatus as defined in claim 11, further comprising:
    a spring for biasing the material removal unit radially away from the interior surface of the metal member.

15. The apparatus as defined in claim 11, further comprising:
a display unit for receiving a signal from the ultrasonic detecting unit and for visually displaying an indication of material removal in the area adjacent the detected defect during powering of the material removal unit.

16. A method of removing a detected defect from an interior surface of an elongate metal member having an axial passageway therein defined at least in part by the interior surface, the method comprising:
positioning a powered material removal unit within the passageway to removal material adjacent the detected defect;
positioning a removal unit support within the passageway for engagement with the metal member to support the removal unit at a desired axial location within the passageway;
providing a powered reciprocation unit for axially reciprocating the removal unit with respect to the support and the metal member;
biasing the removal unit radially outward with respect to the metal member to remove material adjacent the detected defect; and
simultaneously activating the material removal unit and reciprocation unit to remove material on the interior surface of the metal member adjacent the defect.

17. The method as defined in claim 16, further comprising:
monitoring material removed in the area adjacent the detected defect with an ultrasonic detection unit during activation of the material removal unit.

18. The method as defined in claim 16, further comprising:
pivotably mounting the material removal unit on the unit support.

19. The method as defined in claim 16, further comprising:
providing an apparatus base;
securing a plurality of supports to the base; and
mounting a plurality of rollers each on a respective support for supporting and controllably positioning the metal member.

20. The method as defined in claim 16, wherein the step of providing a powered reciprocation unit comprises:
positioning a drive motor exterior of the metal member;
providing a crank arm rotatably driven by the drive motor; and
structurally interconnecting the crank arm and the material removal unit for reciprocating the material removal unit with respect to the removal unit support.

* * * * *

UNITED STATES PATENT AND TRADEMARK OFFICE
CERTIFICATE OF CORRECTION

PATENT NO. : 5,175,964
DATED : January 5, 1993
INVENTOR(S) : Richard J. Girndt It is certified that error appears in the above-identified patent and that said Letters Patent is hereby corrected as shown below:

In Column 10, line 36, (Claim 11) change "removal" to --remove--.

Signed and Sealed this

Ninth Day of November, 1993

Attest:

BRUCE LEHMAN

*Attesting Officer*     *Commissioner of Patents and Trademarks*